United States Patent [19]

Nishijima et al.

[11] Patent Number: 5,144,861
[45] Date of Patent: Sep. 8, 1992

[54] STEERING WHEEL CONSTRUCTION

[75] Inventors: Kazuyoshi Nishijima; Kazuo Inaba; Tomokazu Sugiyama, all of Shizuoka, Japan

[73] Assignee: Nihon Plast Co., Ltd., Japan

[21] Appl. No.: 667,660

[22] Filed: Mar. 11, 1991

[30] Foreign Application Priority Data

Mar. 19, 1990 [JP] Japan .................................. 2-68743
Mar. 19, 1990 [JP] Japan .................................. 2-68744
Aug. 9, 1990 [JP] Japan .................................. 2-211007

[51] Int. Cl.⁵ .............................................. B62D 1/04
[52] U.S. Cl. ................................. 74/552; 403/259; 403/261; 403/359
[58] Field of Search .............. 74/552; 403/259, 261, 403/359

[56] References Cited

U.S. PATENT DOCUMENTS

| | | | |
|---|---|---|---|
| 4,819,961 | 4/1989 | Henigue | 74/552 X |
| 4,892,007 | 1/1990 | Haldric et al. | 74/552 |
| 4,893,520 | 1/1990 | Endo et al. | 74/552 |
| 4,938,094 | 7/1990 | Cochard | 74/552 |

FOREIGN PATENT DOCUMENTS

| | | | |
|---|---|---|---|
| 0148794 | 7/1985 | European Pat. Off. | 74/552 |
| 0233813 | 8/1987 | European Pat. Off. | 74/552 |
| 2592925 | 7/1987 | France | 74/552 |
| 2600134 | 12/1987 | France | 74/552 |
| 61-241262 | 10/1986 | Japan . | |
| 62-255267 | 11/1987 | Japan | 74/552 |
| 63-263166 | 10/1988 | Japan . | |

Primary Examiner—Richard Lorence
Assistant Examiner—William O. Trousdell
Attorney, Agent, or Firm—Ronald P. Kananen

[57] ABSTRACT

In order to permit a steering wheel to be simply connected to a steering shaft having a frusto conical tapered portion, a serrated or splined portion and a threaded portion, in a manner which permits ready adjustment of the wheels' position which respect to the shaft, the central boss of the steering wheel is divided into separate upper and lower boss members. The lower boss member seats on the tapered portion and is rigidly connected with the steering wheel. The upper boss member fits on the serrated portion so that relative rotation is prevented. By tightening a nut on the threaded portion of the steering shaft, force can be applied through the upper boss member to the lower one in a manner which produces a frictional engagement between the lower boss member and the tapered portion which prevents relative rotation. Various mechanical arrangements are provided between the upper and lower boss members to either limit the amount of relative rotation which can occur therebetween prior the tightening of the nut or control the relative rotation to the degree that accidental relative rotation which is not deliberately induced cannot take place, even in the absence of the nut applying sufficient force to prevent relative rotation between the shaft and the lower boss member.

19 Claims, 9 Drawing Sheets

STEERING WHEEL CONSTRUCTION

BACKGROUND OF THE INVENTION

1. Field of the Invention

The present invention relates generally to a steering wheel and more specifically to a steering wheel construction via which the steering wheel and the steering shaft can be connected.

2. Description of the Prior Art

In order to connect the central boss of a steering wheel to a steering shaft, it is a common practise to form corresponding serrated and a tapered sections on the steering shaft and in the central boss and to use a nut and spring washer or plate spring to secure the two components together. The number of serrations which are formed usually numbers in the range of 36 to 40.

As a result of the meshing of the serrations, in the case wherein the positioning of the hub on the shaft is off by one serration, the positioning of the steering wheel is changed by 9°–10°. In the event that happens, it is necessary to remove the wheel from the steering shaft, rotate it to a position in which the required meshing takes place, and again slide the hub into position on the serrated section. This of course tends to increase the amount of work necessary to suitably complete the assembly of the unit.

However, even when the boss is correctly located on the steering shaft and the appropriate serrations are in engagement, still, in the event that the connection at the lower end of the steering shaft is not exactly correct and some positioning error is present, the positioning of the steering wheel can be off by an amount which is approximately half of a serration (e.g., about 5°). In this case, repositioning of the hub on the steering shaft is of no avail and only shifts the position of the offset.

In view of the above, it has been proposed in JP-A-61-241262 to use a plurality of stopper pieces and to adjust the steering wheel angle in a manner which compensates for small offsets. However, with this technique, it is necessary to use a plurality of stopper pieces and requires that the steering shaft be formed with a particular type of configuration. Accordingly, the use of the usual serrations and tapers is rendered impossible.

A further proposal for overcoming the above mentioned problem is disclosed in JP-A-63-263166. In this arrangement, a bush is disposed between the steering shaft and the boss of the steering wheel. This arrangement rendered the angle between the steering shaft and the bush and the angle between the bush and the steering wheel boss separately adjustable with the intention of rendering small angular offsets correctable. However, this technique firstly requires refitting between the bush and the hub. This of course increases the number of operations which are required to achieve the appropriate steering wheel positioning and results in a lot of troublesome time consuming work.

SUMMARY OF THE INVENTION

It is an object of the present invention to provide a technique which enables the use of commonly employed serrations and taper and which allows the adjustment of the steering wheel position without the need for troublesome refitting work and while the wheel is positioned in place on the steering shaft.

In brief, the above object is achieved by an arrangement wherein, in order to permit a steering wheel to be simply connected to a steering shaft having a frusto conical tapered portion, a serrated or splined portion and a threaded portion, in a manner which permits ready adjustment of the wheel's position with respect to the shaft, the central boss of the steering wheel is divided into separate upper and lower boss members. The lower boss member seats on the tapered portion of the steering shaft and is rigidly connected with the steering wheel. The upper boss member fits on the serrated portion of the steering shaft so that relative rotation is prevented. By tightening a nut on the threaded portion of the steering shaft, force can be applied through the upper boss member to the lower one in a manner which produces a frictional engagement between the lower boss member and the tapered portion of the steering shaft which prevents relative rotation. Various mechanical arrangements are provided between the upper and lower boss members to either: (1) limit the amount of relative rotation which can occur therebetween prior to the tightening of the nut, or (2) control the relative rotation, to the degree that accidental relative rotation which is not deliberately induced, cannot take place even in the absence of the nut applying sufficient force to prevent relative rotation between the shaft and the lower boss member.

More specifically, a first aspect of the present invention is provided in a connection arrangement which features: a first member which has a conical bore and which is adapted to seat on a tapered portion of a shaft; a second member which has a configured bore and which is adapted to be received on a configured portion of the shaft in a manner which prevents relative rotation therebetween, the second member being arranged to engage the first member, the second member being arranged to be forced into contact with the first member and to subsequently force the first member into frictional engagement with the tapered portion of the shaft by tightening a nut which is threadedly received on a threaded portion of the shaft; and means for enabling a predetermined limited amount of relative rotation between the first and second members while sufficient force to force the first member into frictional engagement with the tapered portion of the steering shaft and prevent relative rotation therebetween, is absent.

A second aspect of the invention is provided in a connection arrangement for a steering wheel which is to be mounted on a steering shaft, the steering shaft having threaded, serrated and tapered portions, the connection arrangement featuring: a lower boss member which has a conical bore and which is adapted to seat on the tapered portion of the steering shaft, the lower boss member being rigidly connected to a rim of a steering wheel by way of spoke means; an upper boss member which has a serrated bore and which is adapted to be received on the serrated portion of the steering shaft and to seat on the top of the lower boss member, the upper boss member being arranged to be forced into contact with the lower boss member and to subsequently force the lower boss member into frictional engagement with the tapered portion of the steering shaft, by tightening a nut which is threadedly received on the threaded portion of the steering shaft; and means for enabling a predetermined limited amount of relative rotation between the upper and lower boss members while sufficient force to force the lower boss member into frictional engagement with the tapered portion of the steering shaft and prevent relative rotation therebetween, is absent.

A further aspect of the present invention is provided in a steering system which features: a steering shaft having a tapered frusto conical portion, a serrated portion and a threaded portion; a steering wheel including a rim, a central boss portion and at least one spoke interconnecting the rim and the central boss portion, the central boss portion comprising: a lower boss member which has a conical bore and which is adapted to seat on the tapered portion of the steering shaft, the lower boss member being rigidly connected to a rim of a steering wheel by way of spoke means; an upper boss member which has a serrated bore and which is adapted to be received on the serrated portion of the steering shaft and to seat on the top of the lower boss member, the upper boss member being arranged to be forced into contact with the lower boss member and to subsequently force the lower boss member into frictional engagement with the tapered portion of the steering shaft, by tightening a nut which is threadedly received on the threaded portion of the steering shaft; and means for enabling a predetermined limited amount of relative rotation between the upper and lower boss members while sufficient force to force the lower boss member into frictional engagement with the tapered portion of the steering shaft and prevent relative rotation therebetween, is absent.

DETAILED DESCRIPTION OF THE PREFERRED EMBODIMENTS

Figure 2:
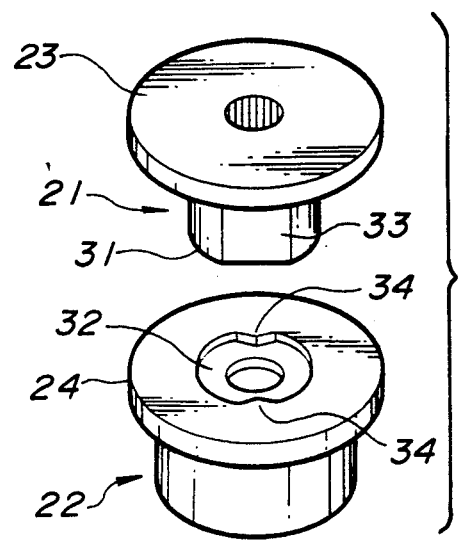
FIG. 2 is an exploded perspective view showing the upper and lower bosses which comprise an essential part of the assembled arrangement shown in FIG. 1.
Figure 3:
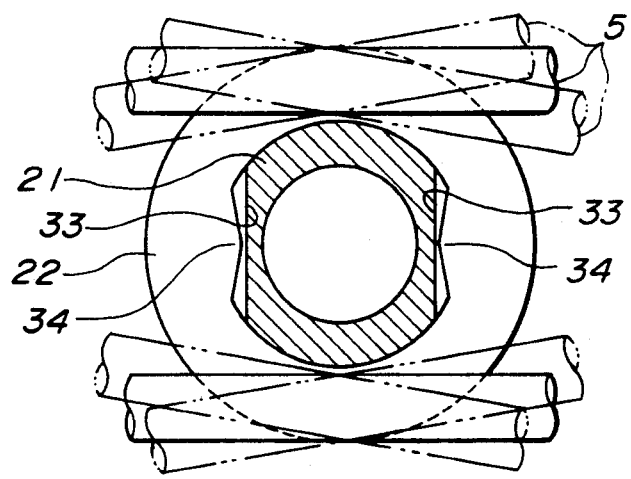
FIG. 3 is a plan view which shows the amount of correction which can be achieved with the first embodiment.
Figure 4:
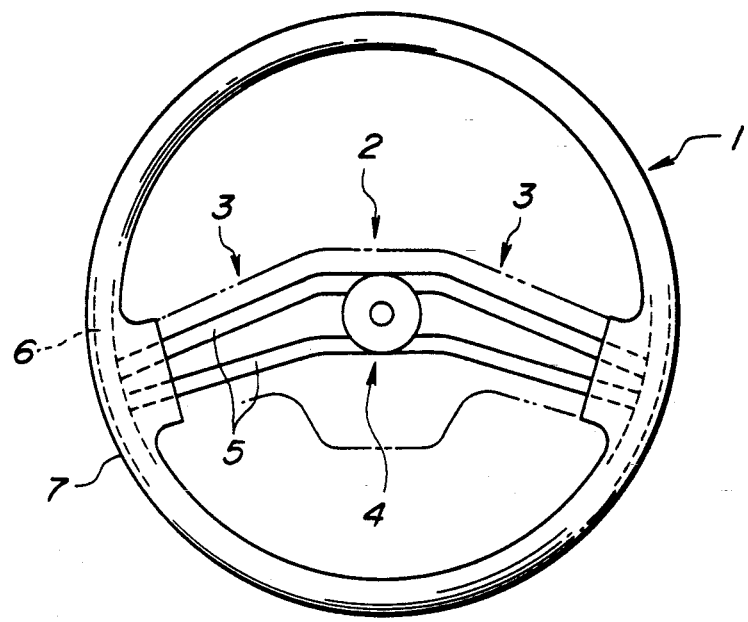
FIG. 4 is a plan view of a steering wheel which is equipped with the first embodiment of the present invention.

FIGS. 1 to 4 show a first embodiment of the present invention. In this arrangement, as best seen in FIG. 4, a steering wheel comprises a circular rim 1 which is connected to a central hub or boss portion 2 by way of spokes 3. The central boss portion 2 in this embodiment comprises an annular metallic boss section 4 which is spot welded or similarly fixedly secured to the central portions of metal shafts 5 which form part of the spokes. The outboard ends of the metal shafts 5 are connected via welding or the like to a metallic core 6 of the rim 1. The metallic core 6 is enclosed in a synthetic resin cover 7.

Figure 1:
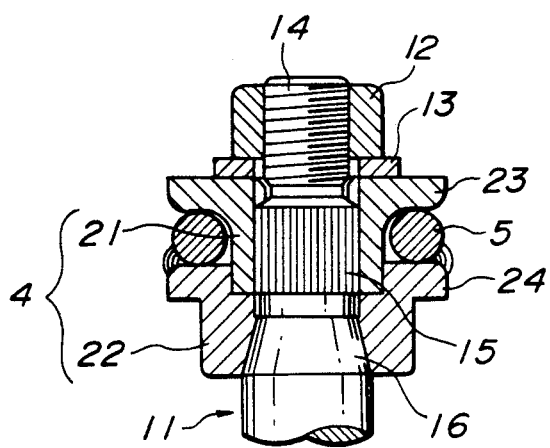
FIG. 1 is a sectioned elevational view showing the construction which characterizes a first embodiment of the present invention.

As shown in FIG. 1, the boss section 4 is secured to the upper end of a vehicular steering shaft 11 by way of a nut 12 and a washer 13. The nut 12 is as shown threadedly engaged with a threaded section 14 of the shaft 11. The shaft is further formed with serrated and tapered sections 15 and 16 in the illustrated manner. An upper boss member 21 is formed with a serrated bore and is disposed on the serrated section 15 in a manner which prevents relative rotation therebetween. A lower boss member 22 is formed with a tapered bore and is disposed on the tapered section 16 of the shaft 11. As there are no teeth in engagement, the lower boss member 22 is relatively rotatable with respect to the shaft 11. The upper and lower boss members 21, 22 are respectively formed with flanges 23, 24 which sandwich the metallic shafts 5 therebetween. The shafts 5 are spot welded to the flange 24 on the lower boss member 22.

By tightening the above mentioned nut 12 on the threaded section 14, the lower boss member 22 can be urged down on the tapered section 16 via the force which is transmitted thereto via the washer 13 and upper boss member 21, until engagement between the lower boss member 22 and the tapered section 16 reaches the level whereat relative rotation with respect to the shaft 11 is prevented.

The upper and lower boss members 21 and 22 are formed in the manner illustrated in FIGS. 2 and 3. That is to say, the upper boss member 21 is formed with a downwardly extending cylindrical section 31 which can be received in a circular recess 32 formed in the top of the lower boss member 22. The cylindrical section 31 is formed with flats 33 while the recess 32 is provided with essentially triangular projections 34 which extend radially inward.

With this construction, while the lower boss member 22 is not forced into engagement with the tapered section 16 of the shaft 11 and the lower boss member 22 is still relatively rotatable with respect to the shaft 11, the upper and lower bosses can be rotated relative to one another by a predetermined small amount as indicated in FIG. 3. As will be appreciated from this figure, the two boss members can be rotated relative to one another through about 10° in either direction and thus provide a total of about 20°.

When the steering wheel is disposed on the steering shaft 11, firstly the lower boss 22 to which the metallic shafts 5 are fixedly connected, is slipped down onto the tapered section 16. Following this, the upper boss 21 is slid into engagement with the serrated section 15, the washer 13 is set in place, and the nut 12 screwed onto the threaded section 14.

At this stage, it is important that the upper boss 21 be set in the correct position on the serrated portion 15.

Before the nut 12 is tightened down, the lower boss member 22 is still relatively rotatable with respect to the shaft 11 through the limited amount depicted in FIG. 3. Accordingly, the rim 1 can be rotated to adjust for any minor deviations and so that the appropriate orientation and angling of the spokes 3 is achieved. By tightening the nut 12 until relative rotation between the shaft 11 and the lower boss member 22 is securely prevented, the steering wheel can be secured in exactly the desired position.

As will be appreciated, this technique of securing the steering wheel to the upper end of the steering shaft enables the ready compensation for any minor deviations which may occur and in a manner which obviates the need for the above described troublesome resettings. This technique further permits the use of very simple apparatus which can be used with existing types of steering shafts (viz., steering shafts having serrated and tapered sections).

With the instant embodiment, even if the nut 12 comes a little loose and the normal engagement pressure between the lower boss member 22 and the tapered section 16 reduces to the point where some relative rotation between the two is possible, as rotation between the upper boss member 21 and the shaft 11 is securely prevented by the splined connection provided by the serrations, the amount of rotation which is permitted between the rim and the shaft 11 is limited to that illustrated in FIG. 3. Accordingly, the rim 1 is prevented from rotating freely with respect to the steering shaft and vehicular control can be maintained in a manner which enables the avoidance of major accidents and the like.

SECOND EMBODIMENT

Figure 5:
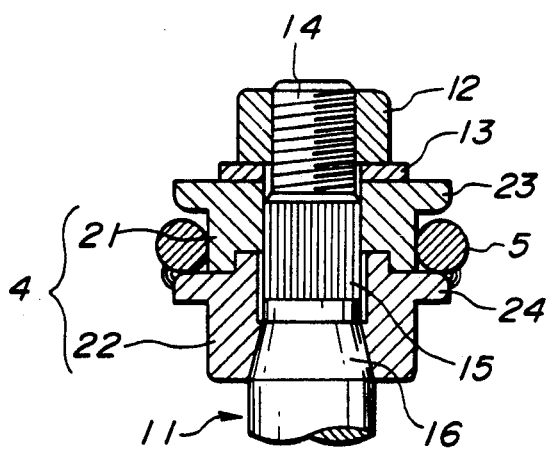
FIG. 5 is a sectioned elevational view showing a second embodiment of the present invention.
Figure 6:
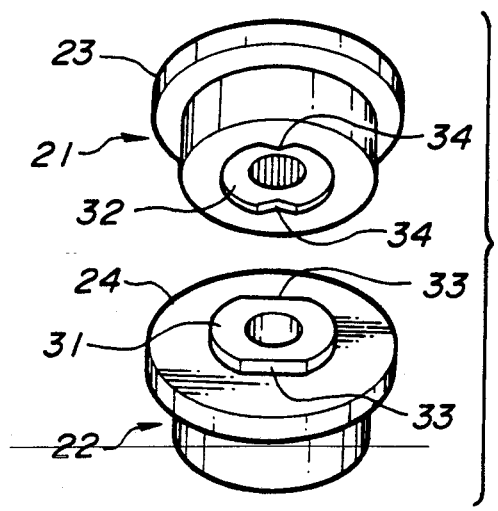
FIG. 6 is an exploded type of perspective view showing constructional features of the upper and lower bosses which form part of the second embodiment.

FIGS. 5 and 6 show a second embodiment of the present invention. This arrangement is basically similar to the first and features that basic difference in that the upper boss member 21 is formed with the circular recess 32 and the triangular projections 34 while the lower boss member 22 is formed with cylindrical projection 31 on which the flats 33 are provided. The effect of this embodiment is essentially identical to the first one.

THIRD EMBODIMENT

Figure 7:
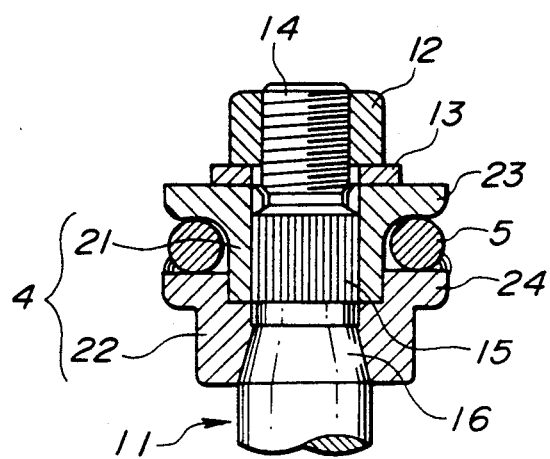
FIG. 7 is a sectioned elevational view showing the construction which characterizes a third embodiment of the present invention.
Figure 8:
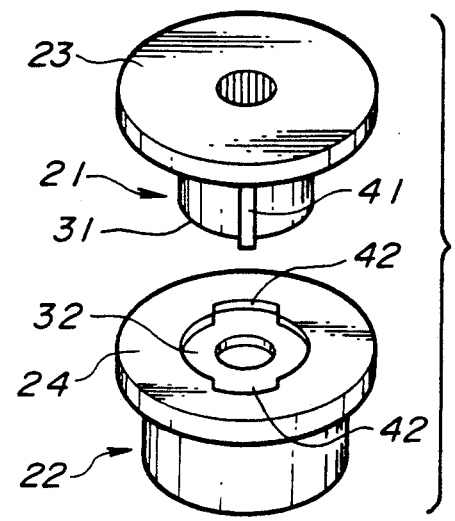
FIG. 8 is a exploded view showing details of the upper and lower boss members which form part of the third embodiment.
Figure 9:
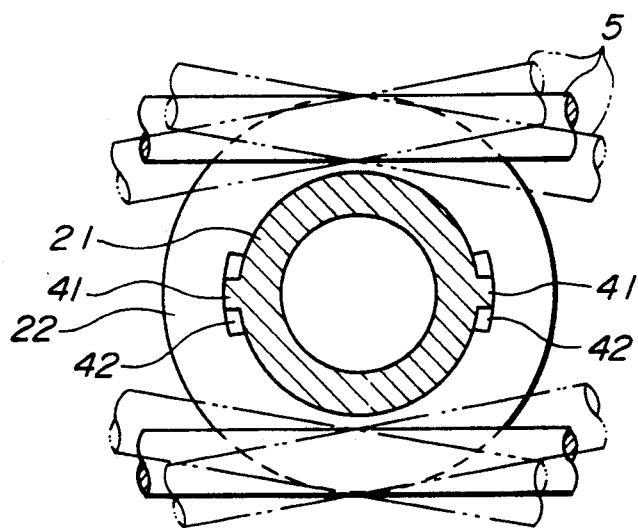
FIG. 9 is a plan view showing the amount of correction which is enabled with the third embodiment.

FIGS. 7 to 9 show a third embodiment of the present invention. In this arrangement, the upper boss is formed with two diametrically opposite spline-like projections 41 which extend from the cylindrical section 31 and wherein the circular recess 32 is formed with diametrically opposed recesses 42. When the two boss sections 21, 22 are assembled together, the spline-like projections 41 are received in the diametrically opposed recesses 42. As shown in FIG. 9 the amount of relative rotation that can occur between the two boss portions 21, 22 is of course limited by this arrangement and the same effect as achieved with the above described embodiments is achieved also in this instance.

FOURTH EMBODIMENT

Although not illustrated a fourth embodiment comprises the arrangement wherein the cylindrical projection 31 and spline-like projections 41 are formed on the lower boss member 22 and the cylindrical recess 32 and the diametrically opposite recess 42 are formed on the upper one 21. Viz., the inverse of the third embodiment shown in FIGS. 7 to 9.

FIFTH EMBODIMENT

Figure 10:
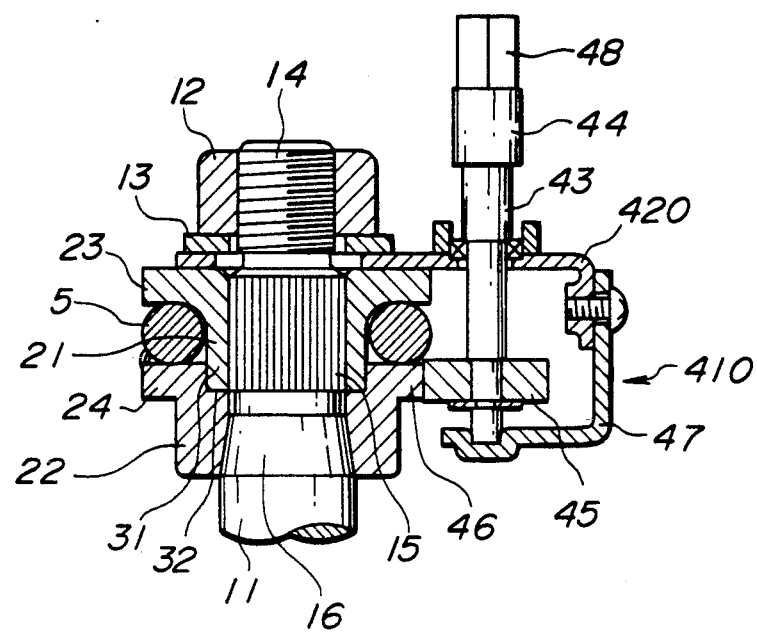
FIG. 10 is a sectioned elevational view showing the construction which characterizes a fifth embodiment of the present invention.
Figure 11:
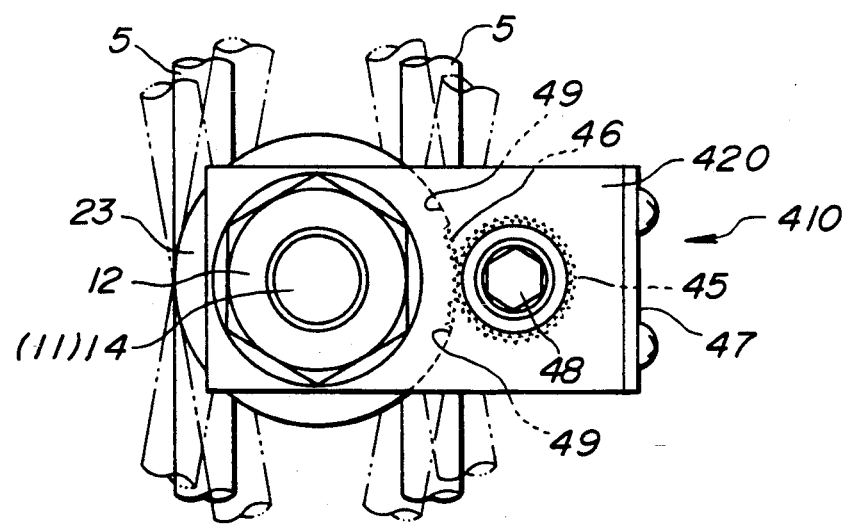
FIG. 11 is a plan view showing the fifth embodiment and depicting the amount of correction which is enabled with this embodiment.
Figure 12:
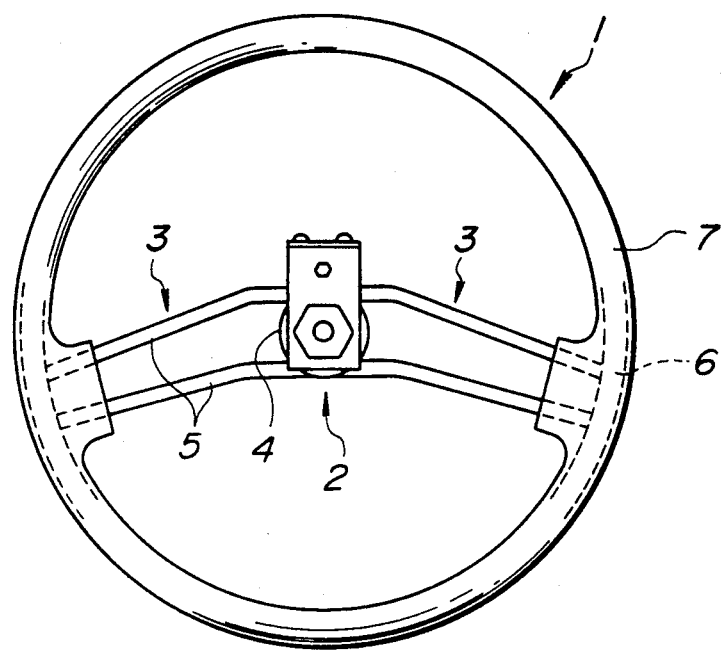
FIG. 12 shows a steering wheel equipped with the fifth embodiment.

FIGS. 10 to 12 show a fifth embodiment of the invention. In this arrangement, the construction and arrangement of the upper and lower boss members 21, 22 are formed with a plain cylindrical projection 31 and a circular recess 32, respectively. The upper and lower boss members 21, 22 are interconnected by a gear mechanism generally denoted by the numeral 410. This gear mechanism comprises a support bracket 420 which is fixedly connected to the flange 23 formed on the upper boss member 21 via spot welding. A bearing 43 which is formed in the support bracket 420 rotatably supports a shaft 44. A gear 45 is fixedly connected to the shaft 44 proximate the lower end thereof. This gear 45 meshes with a rack-like geared section 46 formed in the outer periphery of the flange 24 of the lower boss member 22. The lower end of the shaft 44 is rotatably supported by a second support bracket 47 which is detachably secured to the first support bracket 420. The upper end of the shaft 44 is formed with a hexagonal head 48 or the like which permits a wrench to be operatively applied thereto.

With this construction, it is possible to use a wrench or the like to rotate the shaft 44 and due to the meshing of the gears 45 and 46 induce relative rotation between the upper and lower boss members 21, 22. As will be appreciated from FIG. 11 as the number of gear teeth which are formed on the periphery of the flange 24 between the limits 49 is limited, the amount of relative rotation that can be induced is that shown.

With this embodiment, it is possible to adjust for any minor deviations which may have occurred by rotating the shaft until the resulting relative rotation between the upper and lower boss members 21, 22 rotates the rim 1 to the required position. Following this, tightening of the nut 12 secures the arrangement in place.

In this embodiment also, if the nut 12 should accidentally slacken off, as the number of teeth formed on the outer periphery of the flange 24 is limited, mount of relative rotation which can occur between the upper and lower boss members 21, 22 is limited and total loss of steering ability cannot occur.

If so desired, constructions such as those used in the first to fourth embodiments can also be used in combination with the above described gearing.

SIXTH EMBODIMENT

Figure 13:
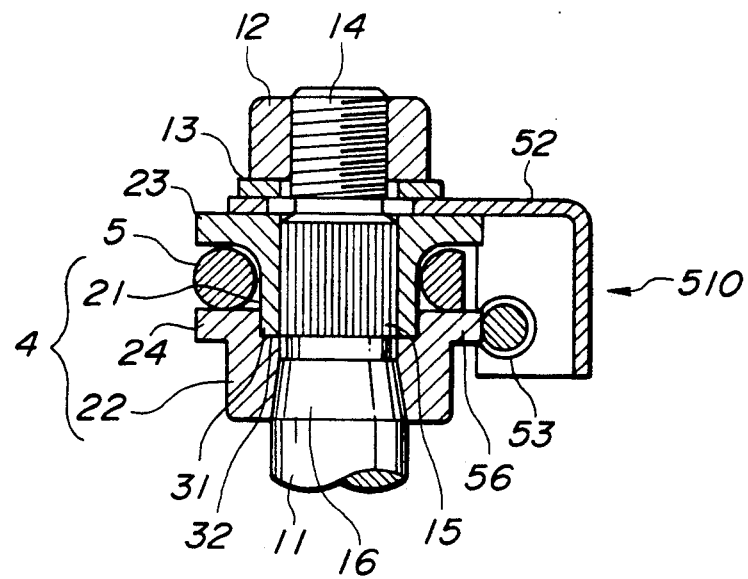
FIGS. 13, 14 and 15 are views showing a sixth embodiment of the present invention.
Figure 14:
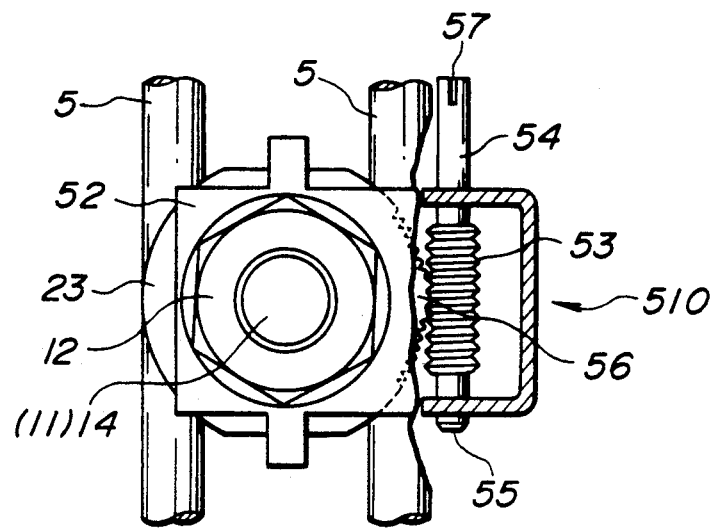
Figure 15:
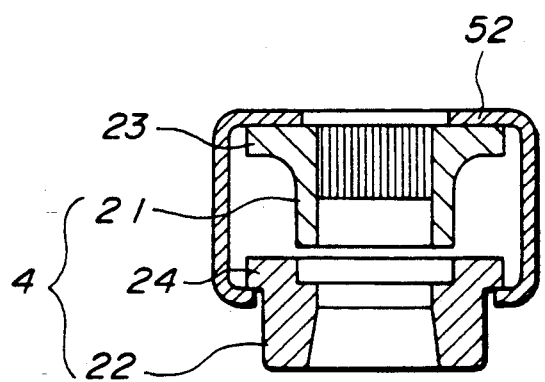

FIGS. 13 to 15 show a sixth embodiment of the present invention. In this arrangement, the gear 45 of the previous embodiment is replaced with a worm gear arrangement generally denoted by the numeral 510. More specifically, a support bracket 52 is fixedly connected to the upper boss member 23 and a worm 53 rotatably supported therein on a shaft 54. Axial movement of the shaft 54 with respect to the support bracket 52 is prevented by non-illustrated means.

The outer periphery of the flange 24 of the lower boss member 22 is formed with a worm-wheel 56 along a selected portion thereof. This worm wheel, as shown, is arranged to mesh with the worm gear 53.

One end of the shaft 54 is formed with a slot 57 into which a driver can be inserted. Via rotating the shaft 54, relative rotation of the nature disclosed above in connection with the fifth embodiment can be achieved.

As it is very difficult for the worm gear to be driven to rotate by the worm wheel formed on the lower boss member 22, even if the nut 12 comes loose, relative rotation between the upper and lower boss members 21, 22 is strongly resisted and no loss of steering is apt to occur.

SEVENTH EMBODIMENT

FIGS. 16 to 19 show a further embodiment of the present invention. This embodiment is characterized by a worm gear arrangement generally denoted by the numeral 411. In this arrangement, a square nut 421 is welded to the flange 24 of the lower boss member 22, a support bracket 431 is fixedly connected to the upper boss member 21, and a bolt 441 is supported on the bracket and a threaded portion 461 of the same received in the nut 421.

Figure 18:
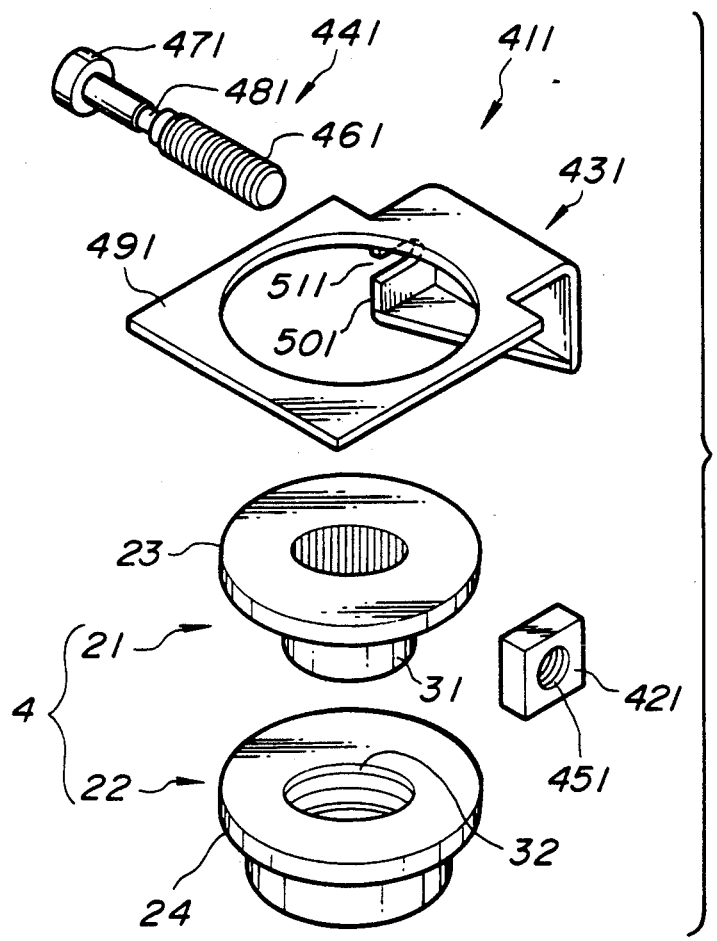
Figure 19:
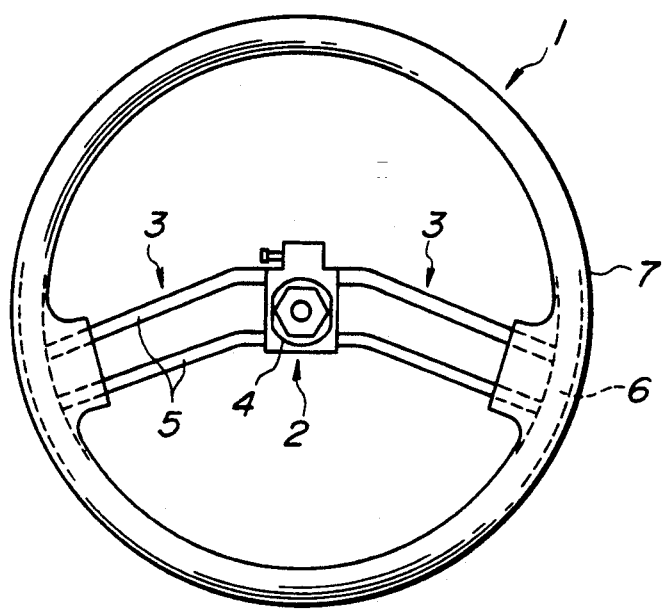

As shown in FIG. 18, the bracket 431 comprises an essentially square shaped horizontally-extending upper portion 491 which is welded to the top of the flange 23 formed on the upper boss member 21, and a side wall portion 501 which extends downwardly at right angles to the upper portion 491. A slot 511 is formed in the side wall 501. The bolt 441 is formed with a head 471, the above mentioned threaded portion 461 and an annular groove 481. The groove 481 is arranged to have a diameter which is just slightly less than the width of the groove 511. With this arrangement, the bolt 441 can be simply slipped into place in the groove and thus supported by the side wall 511 in a manner which limits axial movement.

Figure 16:
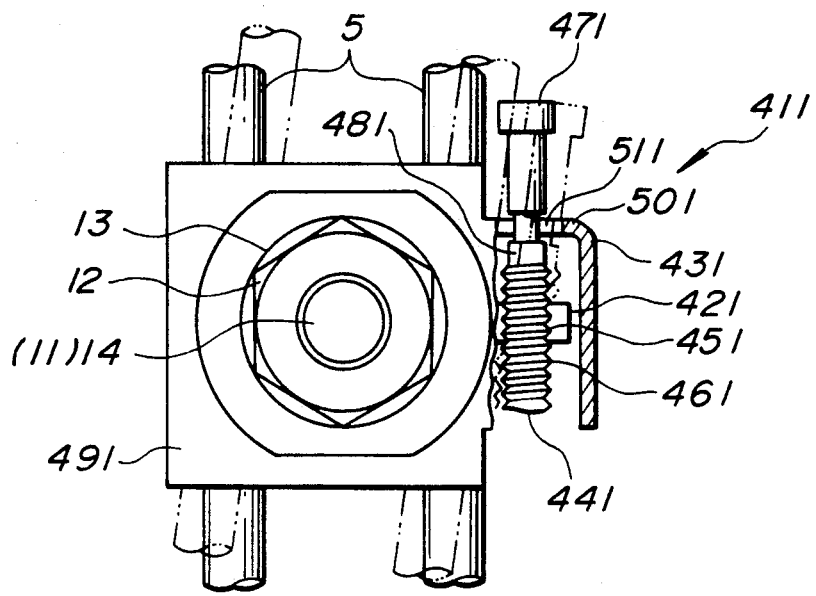
FIGS. 16 to 19 show a seventh embodiment.
Figure 17:
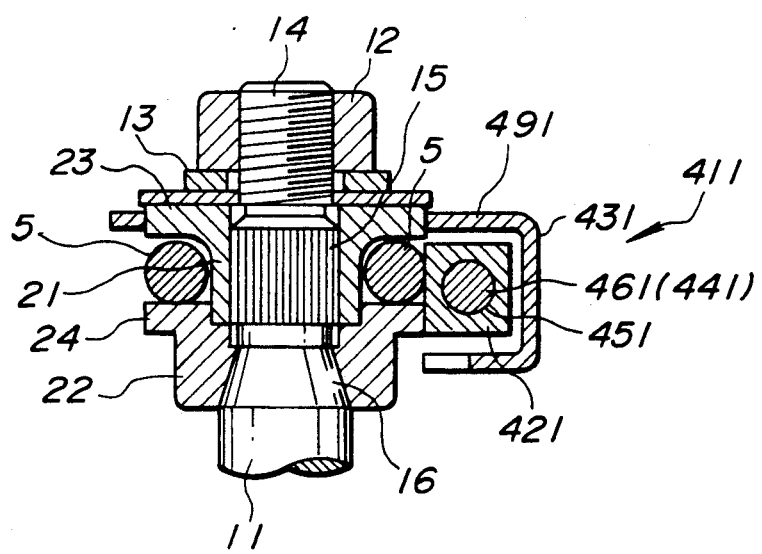

When the above components are assembled in the manner illustrated in FIGS. 16 and 17, rotation of the bolt 441 permits the lower boss member 22 to be rotated with respect to the upper boss member 21 from the position shown in solid line (FIG. 16) to the position illustrated in phantom.

With this embodiment, should the nut 12 accidentally come loose, rotation of the bolt 441 is not likely and cannot be induced by applying torque through the rim 1 to the lower boss member 22. Accordingly, steering safety is assured.

EIGHTH EMBODIMENT

Figure 20:
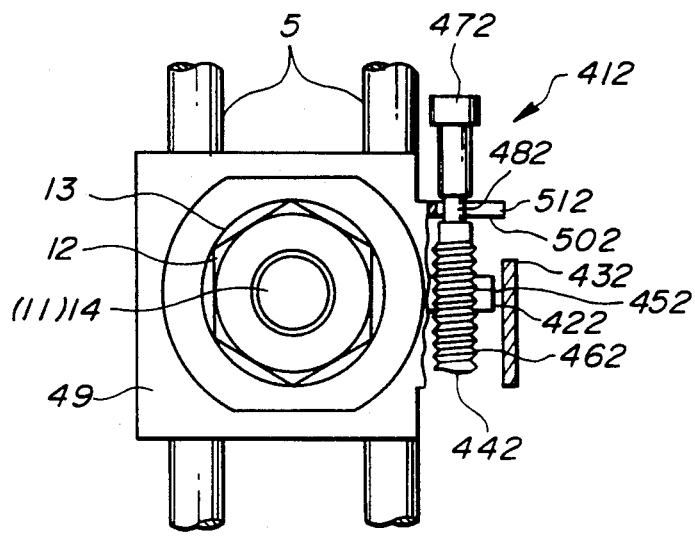
FIGS. 20 to 22 show constructional details of a eighth embodiment
Figure 21:
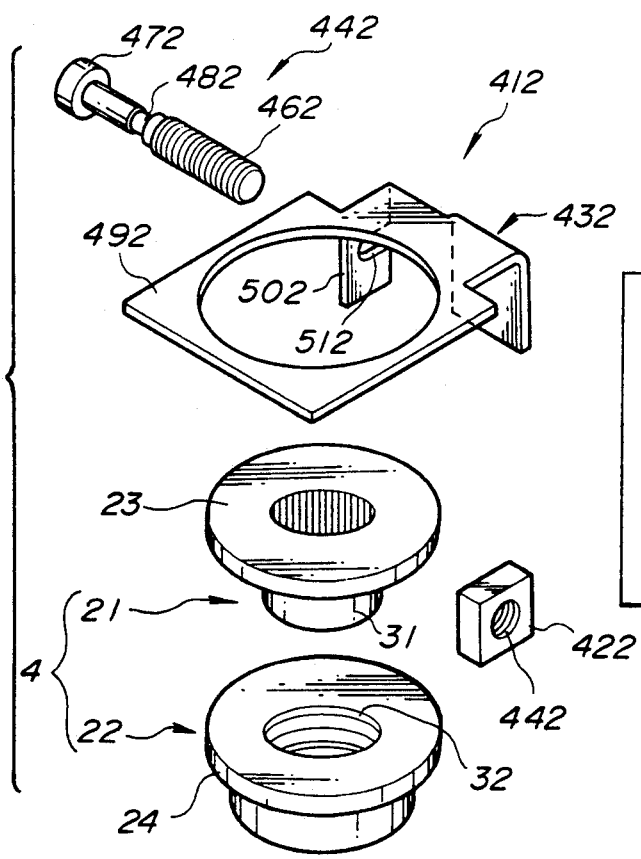

FIGS. 20 and 21 show another embodiment of the present invention. As will be readily appreciated, the construction of this arrangement is basically similar to that of the seventh embodiment and differs in that the slot 512 which is adapted to cooperate with the annular recess 482 formed in the bolt 442, is formed in a side wall portion 502 of a support bracket 432. The slot opens outwardly in this instance.

Figure 22:
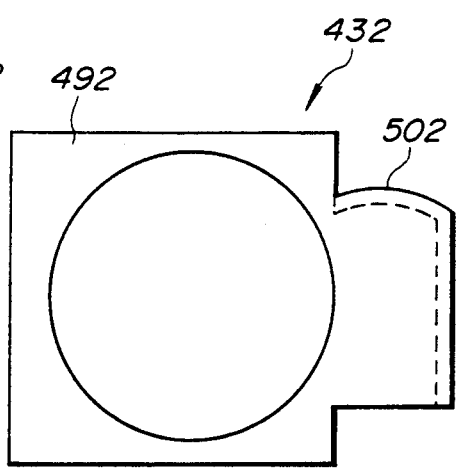

It will be noted that with the seventh and eighth embodiments, it is possible to form the side walls 501, 502 so as to exhibit a convexly curved configuration such as shown in FIG. 22. As will be appreciated, this curvature facilitates operation of the adjustment mechanism and allows the bolt to remain coaxially aligned with the bore of the nuts 421, 422 as relative rotation between the upper and lower boss members 21, 22 is induced via rotation of the bolt.

Of course the present invention is not limited to the specific embodiments disclosed above and various variations and combinations can be made without departing from the scope of the invention which is defined in the appended claims.

What is claimed is:

1. A connection arrangement for a steering wheel which is to be mounted on a steering shaft, the steering shaft having threaded, serrated and tapered portions, the connection arrangement comprising:

a lower boss member which has a conical bore and which is adapted to seat on the tapered portion of the steering shaft, the lower boss member being rigidly connected to a rim of a steering wheel by way of spoke means;

an upper boss member which has a serrated bore and which is adapted to be received on the serrated portion of the steering shaft and to seat on the top of the lower boss member, said upper boss member being arranged to be forced into contact with the lower boss member and to subsequently force the lower boss member into frictional engagement with the tapered portion of the steering shaft, by tightening a nut which is threadedly received on the threaded portion of the steering shaft, said spoke means being arranged to be gripped between said upper and lower boss members with the nut being tightened; and means for limiting the amount of relative rotation between said upper and lower boss members to a predetermined angle greater than 0° while sufficient force to force the lower boss member into frictional engagement with the tapered portion of the steering shaft and to prevent relative rotation therebetween, is absent.

2. A connection arrangement comprising:

a first member which has a conical bore and which is adapted to seat on a tapered portion of a shaft, the first member being rigidly connected to a rim of a steering wheel by way of spoke means;

a second member which has a shaped bore and which is adapted to be received on a shaped portion of the shaft in a manner which prevents relative rotation therebetween, the second member being arranged to be engaged with the first member, said second member being arranged to be forced into contact with the first member and to subsequently force the first member into frictional engagement with the tapered portion of the shaft, by tightening a nut which is threadedly received on a threaded portion of the shaft, said spoke means being arranged to be gripped between said first and second members when the nut is tightened; and means for limiting the amount of relative rotation between said first and second members to a predetermined angle greater than 0° while sufficient force to force the first member into frictional engagement with the tapered portion of the steering shaft and to prevent relative rotation therebetween, is absent.

3. In a steering system, a steering shaft having a tapered frusto conical portion, a serrated portion and a threaded portion;

a steering wheel including a rim, a central boss portion and at least one spoke interconnecting the rim and the central boss portion, the central boss portion comprising:

a lower boss member which has a conical bore and which is adapted to seat on the tapered portion of the steering shaft, the lower boss member being rigidly connected to the rim of the steering wheel by way of spoke means;

an upper boss member which has a serrated bore and which is adapted to be received on the serrated portion of the steering shaft and to seat on the top of the lower boss member, said upper boss member being arranged to be forced into contact with the lower boss member and to subsequently force the lower boss member into frictional engagement with the tapered portion of the steering shaft, by tightening a nut which is threadedly received on the threaded portion of the steering shaft, said spoke means being tightly clamped between said upper and lower bosses when the nut is tightened; and means for limiting the amount of relative rotation between said upper and lower boss member to a predetermined angle greater than 0° while sufficient force to force the lower boss member into frictional engagement with the tapered portion of the steering shaft and to prevent relative rotation therebetween, is absent.

4. A steering system as claimed in claim 3 wherein said means for limiting the amount of relative rotation between the upper and lower boss members comprises:
a recess formed in one of the upper and lower boss members;
means defining shaped projections on the walls of the recess and which extend into the recess; and
a cylindrical portion on the other of the upper and lower boss members and which fits into the recess, the cylindrical portion having flat surfaces defined thereon, the shaped projections and the flat surfaces being dimensioned such that the predetermined amount of relative rotation before engagement occurs between the shaped projections and the flat surfaces.

5. A steering system as claimed in claim 3 wherein said means for limiting the amount of relative rotation between the upper and lower boss members comprises
a recess formed in one of the upper and lower boss members;
means defining a shaped recess in the walls of the recess;
a cylindrical portion on the other of the upper and lower bosses and which fits into the recess, the cylindrical portion having projections defined thereon, the projections and the shaped recess being dimensioned such that the predetermined amount of relative rotation before engagement occurs between the projections and the shaped recesses.

6. A steering system as claimed in claim 3 wherein said lower and upper boss members are respectively formed with first and second annular flanges which are extended essentially perpendicular to an axis of said steering shaft, which are opposed to each other, and which are spaced so as to tightly clamp said spoke means therebetween.

7. A steering system as claimed in claim 3 wherein said means for limiting the amount of relative rotation between the upper and lower boss members to a predetermined angle comprises:
a recess formed in one of the upper and lower boss members, said recess defining a first arcuate wall portion;
a cylindrical portion formed on the other of the upper and lower bosses, said cylindrical portion having a second arcuate wall portion which is slidably engaged with said first arcuate wall portion; and
means for limiting the amount of relative rotation between said first and second arcuate wall portions.

8. A steering system as claimed in claim 4 wherein said flat surface is adapted to abut against said shaped projection so as to limit relative rotation between said upper and lower boss members.

9. A steering system as claimed in claim 5 wherein said projection is adapted to abut, against shaped recess so as to limit relative rotation between said upper and lower boss members.

10. A steering system as claimed in claim 3 wherein said spoke means is welded to said lower boss member, said spoke means and said lower boss member being rotatable in a limited amount relative to said upper boss member and said steering shaft.

11. A steering system as claimed in claim 3, wherein the relative rotation between said upper and lower boss members is limited to a predetermined acute angle.

12. A steering system as claimed in claim 11, wherein said upper and lower boss members are adapted to be rotated relative to one another through about 10 degrees in either direction, thereby providing a total of about 20 degrees.

13. In a steering system,
a steering shaft having a tapered frusto conical portion, a serrated portion and a threaded portion;
a steering wheel including a rim, a central boss portion and at least one spoke interconnecting the rim and the central boss portion, the central boss portion comprising:
a lower boss member which has a conical bore and a first annular flange extending essentially perpendicular to an axis of said steering shaft and which is adapted to seat on the tapered portion of the steering shaft, the lower boss member being rigidly connected to the rim of the steering wheel by way of spoke means;
an upper boss member which has a serrated bore and a second annular flange which extends essentially perpendicular to an axis of said steering shaft and which opposes said first annular flange, said upper boss member being adapted to be received on the serrated portion of the steering shaft and to seat on the top of the lower boss member, said upper boss member being arranged to be forced into contact with the lower boss member and to subsequently force the lower boss member into frictional engagement with the tapered portion of the steering shaft, by tightening a nut which is threadedly received on the threaded portion of the steering shaft, said spoke means being tightly clamped between said upper and lower bosses when the nut is tightened, a surface of said second annular flange of said upper boss member being curved and arranged to engage with a surface of said spoke means while said second annular flange is maintained in abutment with said spoke means; and
means for limiting the amount of relative rotation between said upper and lower boss members to a predetermined angle while sufficient force to force the lower boss member into frictional engagement with the tapered portion of the steering shaft and to prevent relative rotation therebetween, is absent.

14. In a steering system comprising: a steering shaft having a tapered frusto conical portion, a serrated portion and a threaded portion;
a steering wheel including a rim, a central boss portion and at least one spoke interconnecting the rim and the central boss portion, the central boss portion comprising:
a lower boss member which has a conical bore and which is adapted to seat on the tapered portion of the steering shaft, the lower boss member being rigidly connected to the rim of the steering wheel by way of spoke means;

an upper boss member which has a serrated bore and which is adapted to be received on the serrated portion of the steering shaft and to seat on the top of the lower boss member, said upper boss member being arranged to be forced into contact with the lower boss member and to subsequently force the lower boss member into frictional engagement with the tapered portion of the steering shaft, by tightening a nut which is threadedly received on the threaded portion of the steering shaft; and means for limiting the amount of relative rotation between said upper and lower boss members to a predetermined angle greater than 0° while sufficient force to force the lower boss member into frictional engagement with the tapered portion of the steering shaft and to prevent relative rotation therebetween, is absent, said limiting means comprising:

gearing means, said gearing means including:

a manually rotatable member on which a first gearing is formed, and a second gearing which is defined on a flange formed on said lower boss member and which meshes with said first gearing.

15. A steering system as claimed in claim 14 wherein said first and second gearings having straight gear type teeth and are meshed with each other.

16. A steering system as claimed in claim 14 wherein said first and second gearings have worm and worm wheel type teeth and are meshed with each other.

17. A steering system as claimed in claim 14 wherein said second gearing is formed along a predetermined limited portion of the lower boss flange, thereby limiting rotation of said spoke means and said lower boss member in a predetermined limited amount relative to said upper boss member.

18. In a steering system comprising:

a steering shaft having a tapered frusto conical portion, a serrated portion and a threaded portion;

a steering wheel including a rim, a central boss portion and at least one spoke interconnecting the rim and the central boss portion, the central boss portion comprising:

a lower boss member which has a conical bore and which is adapted to seat on the tapered portion of the steering shaft, the lower boss member being rigidly connected to the rim of the steering wheel by way of spoke means;

an upper boss member which has a serrated bore and which is adapted to be received on the serrated portion of the steering shaft and to seat on the top of the lower boss member, said upper boss member being arranged to be forced into contact with the lower boss member and to subsequently force the lower boss member into frictional engagement with the tapered portion of the steering shaft, by tightening a nut which is threadedly received on the threaded portion of the steering shaft; and means for limiting the amount of relative rotation between said upper and lower boss members to a predetermined angle greater than 0° while sufficient force to force the lower boss member into frictional engagement with the tapered portion of the steering shaft and to prevent relative rotation therebetween, is absent, said limiting means comprising:

gearing means, said gearing means including:

a manually rotatable threaded member on which a first gearing is formed, a support bracket which is fixedly connected with the upper boss member and which supports the manually rotatable threaded member; and a nut which is welded to a flange formed on said lower boss member and in which the manually rotatable threaded member is threadedly received.

19. In a steering system a steering shaft having a tapered frusto conical portion, a serrated portion and a threaded portion;

a steering wheel including a rim, a central boss portion and at least one spoke interconnecting the rim and the central boss portion, the central boss portion comprising:

a lower boss member which has a conical bore and which is adapted to seat on the tapered portion of the steering shaft, the lower boss member being rigidly connected to the rim of the steering wheel by way of spoke means;

an upper boss member which has a serrated bore and which is adapted to be received on the serrated portion of the steering shaft and to seat on the top of the lower boss member, said upper boss member being arranged to be forced into contact with the lower boss member and to subsequently force the lower boss member into frictional engagement with the tapered portion of the steering shaft, by tightening a nut which is threadedly received on the threaded portion of the steering shaft; and means for limiting the amount of relative rotation between said upper and lower boss member to a predetermined angle greater than 0° while sufficient force to force the lower boss member into frictional engagement with the tapered portion of the steering shaft and to prevent relative rotation therebetween, is absent, said limiting means comprising:

a recess formed in said upper boss member;

means defining shaped projections on the walls of the recess and which extend into the recess; and a cylindrical portion on said lower boss member and which fits into the recess, the cylindrical portion having flat surfaces defined thereon, the shaped projections and the flat surfaces being dimensioned such that the predetermined amount of relative rotation before engagement occurs between the shaped projections and the flat surfaces.

* * * * *